(12) United States Patent  
Ito

(10) Patent No.: US 9,708,021 B2  
(45) Date of Patent: Jul. 18, 2017

(54) SIDE STAND OF MOTORCYCLE

(71) Applicant: Kawasaki Jukogyo Kabushiki Kaisha, Kobe-shi, Hyogo (JP)

(72) Inventor: Koji Ito, Hyogo (JP)

(73) Assignee: KAWASAKI JUKOGYO KABUSHIKI KAISHA, Kobe-Shi, Hyogo (JP)

( * ) Notice: Subject to any disclaimer, the term of this patent is extended or adjusted under 35 U.S.C. 154(b) by 0 days.

(21) Appl. No.: 14/883,516

(22) Filed: Oct. 14, 2015

(65) Prior Publication Data

US 2016/0031504 A1    Feb. 4, 2016

Related U.S. Application Data

(63) Continuation of application No. PCT/JP2014/050949, filed on Jan. 20, 2014.

(30) Foreign Application Priority Data

Apr. 23, 2013    (JP) .................................. 2013-090033

(51) Int. Cl.
*B62H 1/02*    (2006.01)

(52) U.S. Cl.
CPC ..................................... *B62H 1/02* (2013.01)

(58) Field of Classification Search
CPC ...................................................... B62H 1/02
See application file for complete search history.

(56) References Cited

U.S. PATENT DOCUMENTS

| 2,395,148 | A | * | 2/1946 | Schwinn | B62H 1/02 280/301 |
| 4,563,016 | A | * | 1/1986 | Holleron, Jr. | B62H 1/02 280/293 |
| 4,638,880 | A | * | 1/1987 | Togashi | B62H 1/02 180/219 |
| 4,651,845 | A | * | 3/1987 | Yagasaki | B62H 1/02 180/219 |

(Continued)

FOREIGN PATENT DOCUMENTS

| CN | 101356090 | 1/2009 |
| GB | P1003670 | 9/1965 |

(Continued)

OTHER PUBLICATIONS

International Search Report for PCT/JP2014/050949, filed Jan. 20, 2014.

(Continued)

*Primary Examiner* — Kevin Hurley  
*Assistant Examiner* — Gabriela C Craciun

(57) ABSTRACT

A side stand mounted on a motorcycle includes: a leg portion brought into contact with a ground when the side stand stands; an attaching portion connected to a base end of the leg portion and having a pair of opposed walls; a collar extending through one opposed wall and brought into contact with an inner surface of the other opposed wall; a screw member inserted through the collar from an outer lateral side of the one opposed wall and screwed into a threaded hole of the other opposed wall; and a nut screwed onto a tip end portion of the screw member and tightened to an outer surface of the other opposed wall.

6 Claims, 4 Drawing Sheets

(56) References Cited

U.S. PATENT DOCUMENTS

| | | | | |
|---|---|---|---|---|
| 4,883,284 | A * | 11/1989 | Nakazawa | B62H 1/02 180/219 |
| 5,358,265 | A * | 10/1994 | Yaple | B62H 1/02 280/293 |
| 5,992,587 | A * | 11/1999 | Maldonado | B60T 1/065 180/219 |
| 7,575,245 | B2 | 8/2009 | Chuang | |
| 7,914,033 | B2 | 3/2011 | Nethery | |
| 8,003,903 | B2 * | 8/2011 | Nakazawa | B62H 1/02 200/11 D |
| 8,517,408 | B2 * | 8/2013 | Miyaji | B62H 1/02 280/301 |
| 9,434,440 | B2 * | 9/2016 | Kunisada | F01N 13/1805 |
| 2003/0102657 | A1 * | 6/2003 | Kuo | B62H 1/12 280/755 |
| 2003/0111823 | A1 * | 6/2003 | Kuboshima | B62H 1/02 280/301 |
| 2004/0212172 | A1 * | 10/2004 | Nakazawa | B62H 1/02 280/293 |
| 2005/0275268 | A1 * | 12/2005 | Oomori | B62J 1/28 297/352 |
| 2007/0200315 | A1 * | 8/2007 | Ogawa | B62H 1/02 280/293 |
| 2008/0143074 | A1 * | 6/2008 | Chuang | B62H 1/02 280/301 |
| 2008/0252041 | A1 * | 10/2008 | Safarik | B62H 1/02 280/293 |
| 2009/0066057 | A1 * | 3/2009 | Nakazawa | B62H 1/02 280/301 |
| 2009/0212532 | A1 * | 8/2009 | Kudo | B62H 1/02 280/301 |
| 2009/0243381 | A1 * | 10/2009 | Tahara | B60T 7/042 303/114.1 |
| 2009/0250899 | A1 * | 10/2009 | Nethery | B62H 1/12 280/298 |
| 2012/0056402 | A1 * | 3/2012 | Miyaji | B62H 1/02 280/293 |
| 2013/0015633 | A1 * | 1/2013 | Nakabayashi | B62K 25/283 280/281.1 |
| 2013/0320649 | A1 * | 12/2013 | Zhu | B62H 1/02 280/302 |
| 2015/0129326 | A1 * | 5/2015 | Ozaki | B62K 3/007 180/6.2 |
| 2015/0217822 | A1 * | 8/2015 | Sturdevant | B62H 1/02 280/298 |
| 2016/0001834 | A1 * | 1/2016 | Ramraika | B62H 1/02 280/301 |

FOREIGN PATENT DOCUMENTS

| | | |
|---|---|---|
| JP | 41-020166 | 11/1966 |
| JP | 54-000862 | 1/1979 |
| JP | 59-043275 | 3/1984 |
| JP | 62-156092 | 10/1987 |
| JP | 03-047898 | 5/1991 |
| JP | 04-066379 | 3/1992 |
| JP | H04-66379 | * 3/1992 |
| JP | 2005-271848 | 10/2005 |
| JP | 2010-023685 | 2/2010 |

OTHER PUBLICATIONS

English Translation of the International Preliminary Report on Patentability and Written Opinion of the International Searching Authority mailed Nov. 5, 2015 for International PCT Patent Application No. PCT/JP2014/050949, filed Jan. 20, 2014 (12 pages).

Extended and Supplementary Search Report Issued Nov. 18, 2016 for Corresponding European Patent Application No. 14788632.9 (7 pages).

First Office Action Issued May 2, 2017 for Corresponding Chinese Patent Application No. 201480022951.7 with English language translation of the Search Report attached to the Office Action (7 pages).

* cited by examiner

PRIOR ART

SIDE STAND OF MOTORCYCLE

CROSS REFERENCE TO THE RELATED APPLICATION

This application is a continuation application, under 35 U.S.C §111(a) of international application No. PCT/JP2014/050949, filed Jan. 20, 2014, which claims priority to Japanese patent application No. 2013-090033, filed Apr. 23, 2013, the entire disclosure of which is herein incorporated by reference as a part of this application.

BACKGROUND OF THE INVENTION

Field of the Invention

The present invention relates to improvement of a side stand mounted on a motorcycle.

Description of Related Art

Hitherto, a side stand or kickstand of a motorcycle, having a structure as shown in, for example, FIG. 4, has been known. FIG. 4 shows a principal part of the side stand in which a U-shaped attaching portion having a pair of opposed walls 61 and 62 is formed at a base end of a side stand 70, a bolt insertion hole 64 is formed in the one opposed wall 61, and a threaded hole 65 is formed in the other opposed wall 62. A bracket 67 which supports the side stand 70 has a base portion 67a supported by a motorcycle frame structure, which is not shown, and a tip end portion 67b having a through hole 68. The tip end portion 67b of the bracket 67 is disposed between the pair of opposed walls 61 and 62.

A shoulder bolt 60 is inserted through the bolt insertion hole 64 from the outer lateral side of the one opposed wall 61 so as to pass through the through hole 68 of the bracket 67, and is then screwed into the threaded hole 65 of the other opposed wall 62 such that a step portion 60a of the shoulder bolt 60 is brought into contact with the inner surface of the other opposed wall 62. A self-lock nut 69 is screwed onto a tip end portion of the shoulder bolt 60, whereby the side stand 70 is rotatably supported by the motorcycle frame structure (Patent Document 1).

RELATED DOCUMENT

Patent Document

[Patent Document 1] JP Laid-open Utility Model Publication No. S62-156092

In general, in parking a motorcycle, a side stand of the motorcycle is caused to protrude in a lateral downward direction, and the tip end thereof is brought into contact with the ground, whereby the motorcycle body is parked with three points on a front wheel, a rear wheel, and the side stand as ground contact points. In running, the side stand is kicked up from the ground to be stored such that the side stand does not become an obstacle to running of the motorcycle. As described above, the side stand is often rotated, and thus is required to be durable and stable.

However, according to the side stand 70 of Patent Document 1, in parking or running, the side stand 70 is often rotated downward or upward, and as a result, the shoulder bolt 60 may be loosened in some cases. In addition, an extension allowance L2, which defines an axial force applied portion to which an axial force (fastening force) of the shoulder bolt 60 is applied, has a short length equal to the thickness of the other opposed wall 62. Therefore, when the side stand 70 is rotated, excessive stress concentrates on the extension allowance L2. Thus, flattening of the shoulder bolt 60, that is, flattening of a screw ridge thereof may occur. Furthermore, bending stress to the side stand 70, which is caused due to the weight of the motorcycle body, acts directly on the head portion of the shoulder bolt 60. As a result, the inner surface of the head portion is rubbed, and thus, abrasion or damage of the head portion may occur. Due to such a composite factor, it may not be easy to smoothly and stably rotate the side stand 70, and also, improvement in durability has been required.

SUMMARY OF THE INVENTION

An object of the present invention is to provide a side stand of a motorcycle which is excellent in durability and which is allowed to be smoothly and stably rotated without a bolt being loosened or flattened when the side stand is rotated.

In order to achieve the above-described object, a side stand of a motorcycle according to the present invention includes: a leg portion brought into contact with a ground when the side stand stands; an attaching portion connected to a base end of the leg portion and having a pair of opposed walls; a collar extending through one opposed wall of the pair of opposed walls and brought into contact with an inner surface of the other opposed wall; a screw member inserted through the collar from an outer lateral side of the one opposed wall and screwed into a threaded hole of the other opposed wall; and a nut screwed onto a tip end portion of the screw member and tightened to an outer surface of the other opposed wall.

According to this configuration, when the side stand, which is used with the bracket of the motorcycle frame structure supported between the pair of opposed walls of the attaching portion, is rotated, sliding movement with this rotation of the attaching portion occurs on the collar, and not directly on the screw member. Thus, it is possible to prevent the screw member from being loosened. In addition, since the screw member is not a shoulder bolt, an axial force applied portion (extension allowance), to which a generated axial force is applied, is longer than an axial force applied portion in the conventional art. Thus, the screw member is less likely to become flattened. Furthermore, bending stress to the side stand is received by both the collar and the screw member, and thus rattling caused by tilt of the screw member, when the side stand is rotated, is suppressed. As a result, the side stand can be smoothly and stably rotated, and the durability of the side stand improves.

In the present invention, the collar preferably has a flange portion which is brought into press contact with an outer surface of the one opposed wall. According to this configuration, it is possible to prevent the one opposed wall from being rubbed against a head portion of the screw member to be abraded or damaged. Therefore, it is possible to effectively prevent loosening of the screw member. In particular, by increasing the size of the flange portion, the effect of preventing abrasion or damage is further enhanced, and the effect of preventing loosening of the screw member is enhanced.

In the present invention, the attaching portion is preferably a U-shaped single piece having the pair of opposed walls. The dimensional accuracy of a gap between the pair of opposed walls is important for smooth rotation of the side stand. Since the attaching portion of the side stand is the U-shaped single piece having the pair of opposed walls, the dimensional accuracy of the pair of opposed walls improves. Accordingly, a large error in the dimension of the gap which tends to occur, when the pair of opposed walls are formed as separate components, does not occur, and the side stand can be smoothly rotated.

In the case where the attaching portion is a U-shaped single piece having the pair of opposed walls, preferably, the side stand is supported by a motorcycle frame structure via a bracket, the support bracket is inserted into a gap between the pair of opposed walls, and the side stand is rotatably attached to the bracket via the screw member and the nut. In this case, the collar is preferably provided so as to extend in an insertion hole of the one opposed wall and a through hole of the support bracket. Further, the screw member preferably has a male thread formed also in a portion to be inserted into the through hole of the support bracket.

According to this configuration, an axial force generated in the screw member through screw fastening is applied to a portion from the lower or inner surface of a head portion of the screw member to the upper or inner surface of the nut, that is, to the outer surface of the other opposed wall. Therefore, an axial force applied portion (extension allowance) is longer than the axial force applied portion (extension allowance L2) in the conventional art shown in FIG. 4, and thus the screw member is less likely to become flattened.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
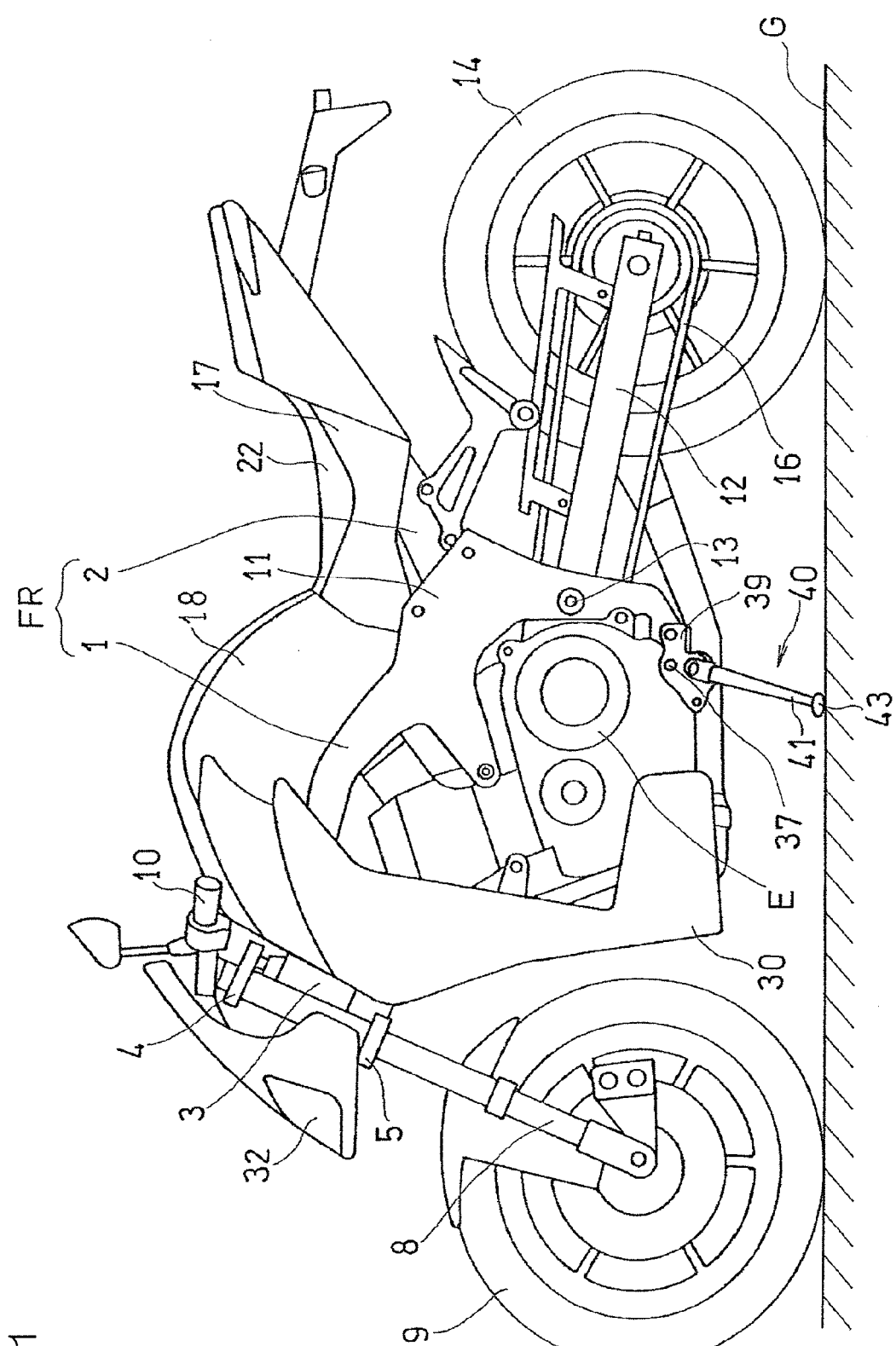
FIG. 1 is a side view of a motorcycle including a side stand according to a preferred embodiment of the present invention.

Hereinafter, preferred embodiments of the present invention will be described with reference to the drawings. FIG. 1 is a side view of a motorcycle including a side stand or kickstand according to a preferred embodiment of the present invention. A motorcycle frame structure FR for the motorcycle includes a main frame 1 which forms a front half of the motorcycle frame structure FR, and a rear frame 2 which is connected to a rear portion of the main frame 1 and forms a rear half of the motorcycle frame structure FR. A head pipe 3 is attached to the front end of the main frame 1, and a steering shaft (not shown) is rotatably inserted through the head pipe 3.

An upper bracket 4 and an under bracket 5 are attached to the steering shaft (not shown). A front fork 8 is supported by the upper bracket 4 and the under bracket 5, and a front wheel 9 is supported by a lower end portion of the front fork 8. A steering handle 10 is attached to the upper bracket 4 located at an upper end portion of the front fork 8.

A swingarm bracket 11 is provided at a rear end portion of the main frame 1. A swingarm 12 is supported by the swingarm bracket 11 via a pivot shaft 13 inserted through a front end portion of the swingarm 12, for swing movement in an up-down direction. A rear wheel 14 is supported by a rear end portion of the swingarm 12. A combustion engine E is supported by a lower and longitudinally intermediate portion of the main frame 1, and drives the rear wheel 14 via a power transmission mechanism 16 such as a chain.

A rider's seat 22 is supported by the rear frame 2. A metallic fuel tank 18 is mounted at an upper portion of the main frame 1, that is, at an upper portion of the motorcycle body, and between the steering handle 10 and the rider's seat 22. A lower region of a rear portion of the fuel tank 18 and a lower region of the rider's seat 22 are covered with a side cover 17 at their lateral sides. A pair of left and right side fairings 30 made of resin material are mounted on a front portion of the motorcycle body so as to cover lateral sides of and a region in front of the combustion engine E. In addition, a headlamp unit 32 is supported by the upper bracket 4 and the under bracket 5.

A support bracket 39 is attached to a lower portion of the swingarm bracket 11 by means of a fastener 37 such as a bolt. A side stand 40 is rotatably supported by the support bracket 39. FIG. 1 shows a state where a ground contact portion 43 at a tip end of the side stand 40 is in contact with a ground G when the motorcycle is parked. During the motorcycle travelling, the side stand 40 is kicked up to be parallel to the longitudinal direction of the motorcycle body and stored in a substantially horizontal attitude, so that the side stand 40 does not become an obstacle to the motorcycle travelling.

Figure 2:
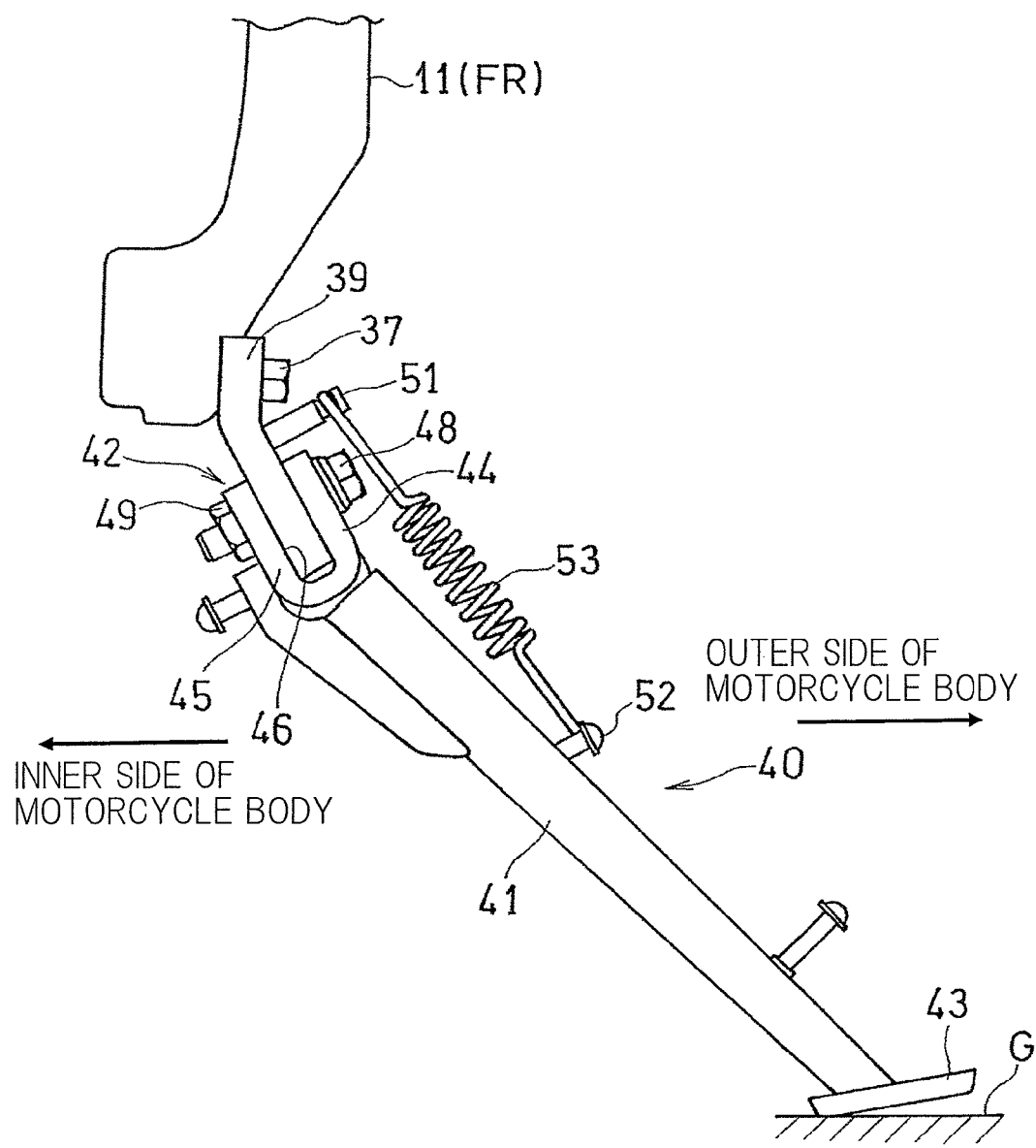
FIG. 2 is an enlarged front view of the side stand.

FIG. 2 shows an enlarged front view of the side stand 40. As shown in FIG. 2, the side stand 40 includes: a straight leg portion 41 which is brought into contact with the ground G when the side stand 40 stands; a U-shaped attaching portion 42 which is connected to a base end of the leg portion 41; and the ground contact portion 43 at a tip end of the leg portion 41. The attaching portion 42 is an integral component or single piece having a pair of opposed walls 44 and 45. The bracket 39 is inserted into a gap 46 between the pair of opposed walls 44 and 45, and the side stand 40 is rotatably attached to the bracket 39 via a screw member 48 and a nut 49. The one opposed wall 44 is located closer to the outer side of the motorcycle body, and the other opposed wall 45 is located closer to the inner side of the motorcycle body. A spring 53 is provided so as to be hooked on and extend between a first locking pin 51 provided on the bracket 39 and a second locking pin 52 provided on the leg portion 41.

Figure 3:
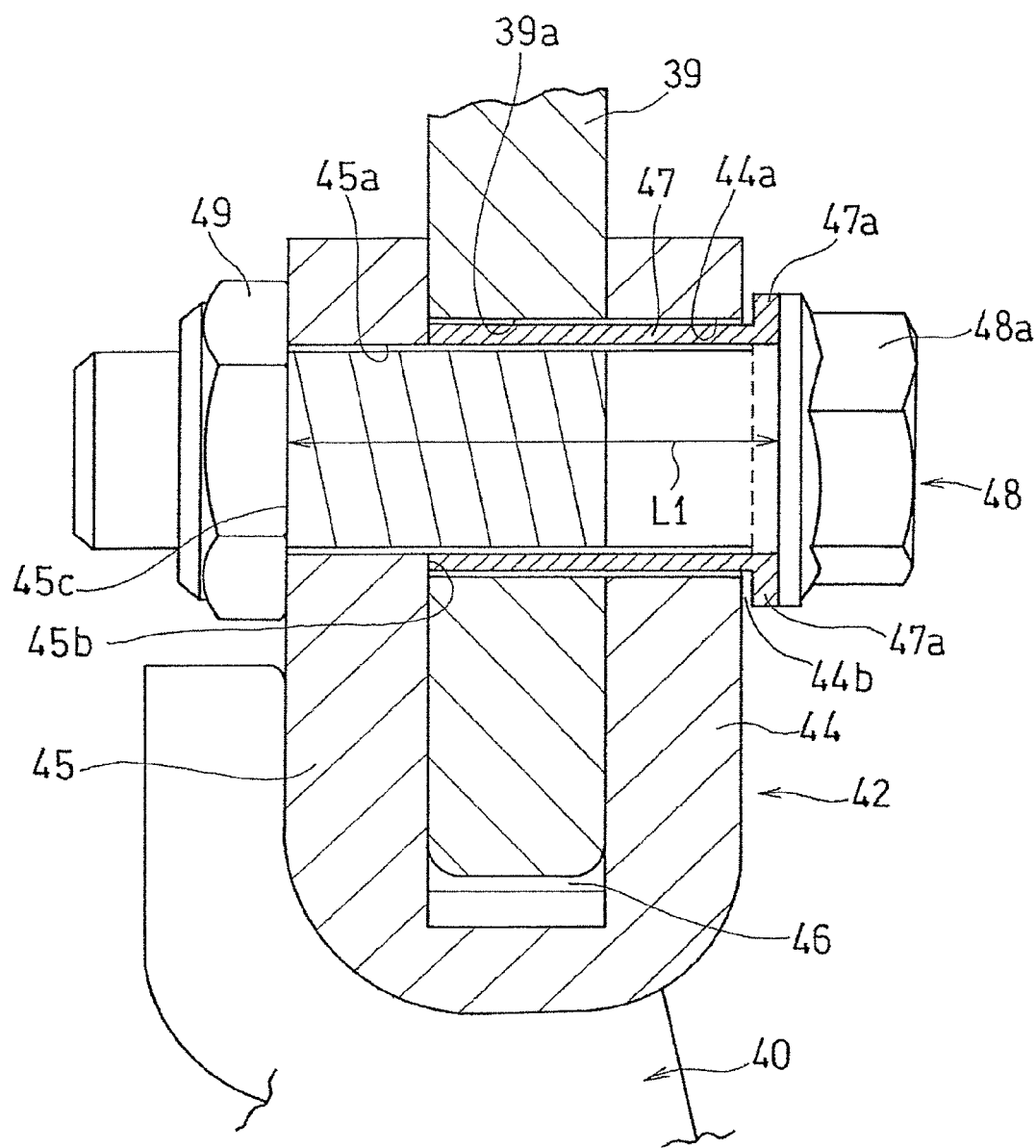
FIG. 3 is a longitudinal cross-sectional view showing a principal part of the side stand.

FIG. 3 shows a longitudinal cross-section of a principal part of the side stand 40. As shown in FIG. 3, an insertion hole 44a is formed in the one opposed wall 44, and a threaded hole 45a is formed in the other opposed wall 45 so as to be concentric with the insertion hole 44a. A through hole 39a is formed in the bracket 39 so as to have a diameter substantially equal to that of the insertion hole 44a. A tubular or cylindrical collar 47 is provided so as to extend in the insertion hole 44a and the through hole 39a. At one end portion of the collar 47, a flange portion 47a is formed which projects radially outward to be close to or brought into contact with an outer side surface 44b of the one opposed wall 44. A tip end portion of the collar 47 is in contact with an inner side surface 45b of the other opposed wall 45.

The flange portion 47a preferably has a large outer diameter to increase an opposed area thereof to the outer side surface 44b of the one opposed wall 44. The screw member 48 is, after being inserted through a hollow portion of the collar 47 from the one opposed wall 44, is screwed into the threaded hole 45a of the other opposed wall 45, and a tip end portion thereof projects from the other opposed wall 45 toward the inner side of the motorcycle body. The nut 49 is threadedly engaged onto a projecting tip end portion of the screw member 48, and then, is brought into press contact with an outer side surface 45c of the other opposed wall 45, thereby preventing rotation of the screw member 48. In this manner, the side stand 40 is rotatably attached to the bracket 39 of the motorcycle frame structure FR.

Figure 4:
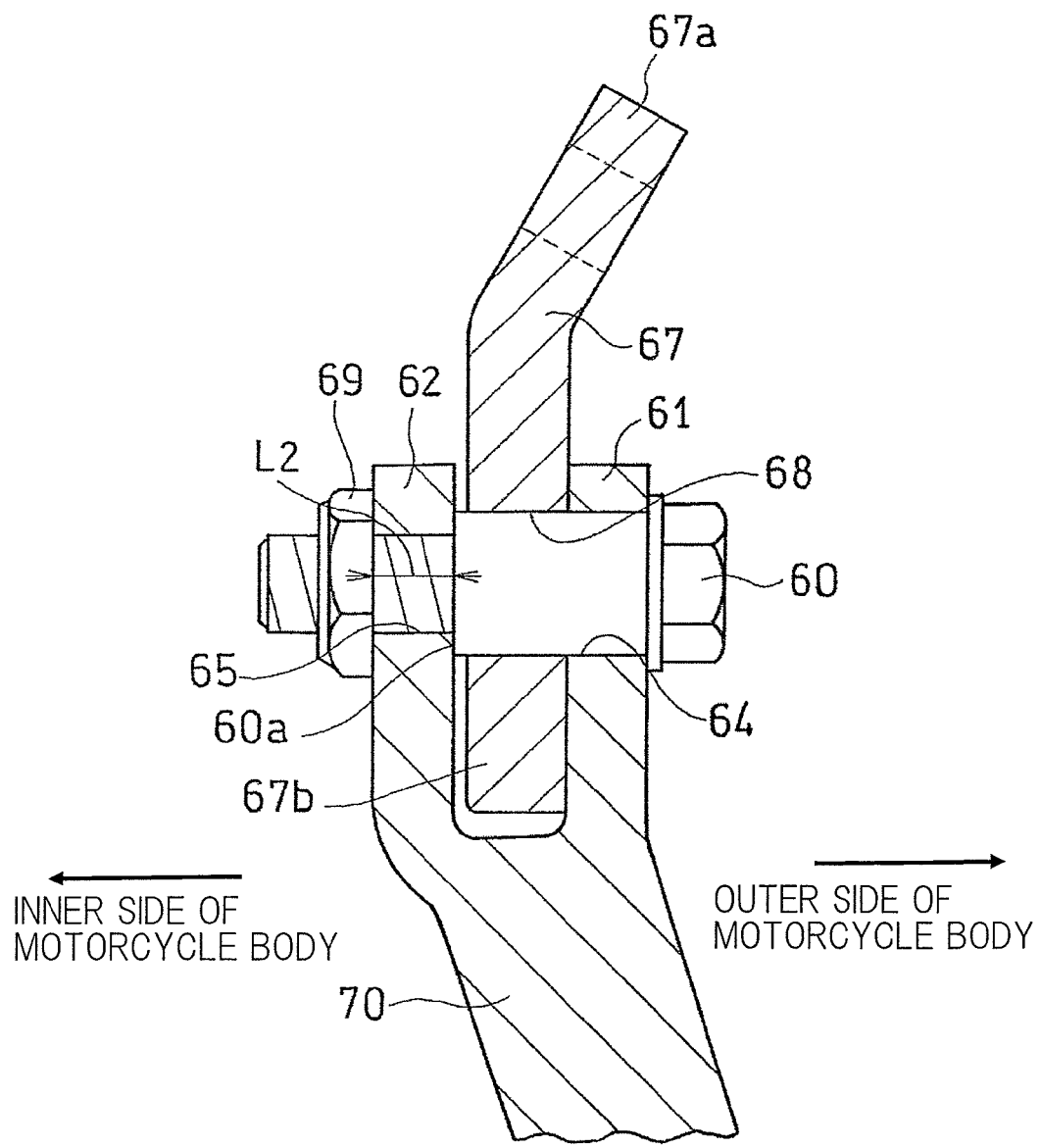
FIG. 4 is a longitudinal cross-sectional view showing a principal part of a conventional side stand.

It is sufficient if a male thread portion of the screw member 48 is formed from a portion to be screwed into the threaded hole 45a of the other opposed wall 45 to the tip end side. However, in this embodiment, the male thread is formed also in a portion to be inserted into the through hole 39a of the bracket 39. An axial force generated in the screw member 48 through screw fastening is applied to a portion from the inner or lower surface of a head portion 48a of the screw member 48 to the inner or upper surface of the nut 49, that is, to the outer side surface 45c of the other opposed wall 45. Therefore, an axial force applied portion (extension allowance L1) is longer than the axial force applied portion (extension allowance L2) in the conventional art shown in FIG. 4, and thus the screw member 48 is less likely to become flattened.

An operation of the side stand 40 having the above-described configuration will be described. For example, in parking the motorcycle, the leg portion 41 of the side stand 40 shown in FIG. 2, which is in a retracted position, is kicked downward against a spring force of the spring 53 to cause the leg portion 41 to stand. Then, the ground contact portion 43 at the tip end of the side stand 40 is brought into contact with the ground G, thereby parking the motorcycle. Reversely to the time of parking, the side stand 40 is kicked up against the spring force of the spring 53 so as to be retracted, whereby a travelling enabled state is obtained.

When the side stand 40 is rotated, sliding movement occurring with this rotation is applied to the collar 47, and is not applied directly to the screw member 48. Thus, it is possible to prevent the screw member 48 from being loosened. In addition, as shown in FIG. 3, the axial force applied portion (extension allowance L1), to which an axial force in the screw member 48 is applied, is longer than the axial force applied portion (extension allowance L2) in the conventional art shown in FIG. 4, and thus, the screw member 48 shown in FIG. 3 is less likely to become flattened. Moreover, since bending stress caused when the side stand 40 is rotated is applied to both the collar 47 and the screw member 48, rattling caused by tilt of the screw member 48, when the side stand 40 is rotated, is suppressed. Thus, the side stand 40 can be smoothly and stably rotated, and the durability of the side stand 40 improves.

The collar 47 is provided with the flange portion 47a which is brought into press contact with the outer side surface of the one opposed wall 44 of the attaching portion 42. Accordingly, when the side stand 40 is rotated, it is possible to prevent the one opposed wall 44 from being rubbed against the head portion 48a of the screw member 48 to be abraded or damaged. Therefore, it is possible to effectively prevent loosening of the screw member 48. In particular, by increasing the size of the flange portion 47a of the collar 47, the effect of preventing abrasion or damage is further enhanced, and the effect of preventing loosening of the screw member 48 is enhanced.

The dimensional accuracy of the gap 46, that is, the dimensional accuracy of the pair of opposed walls 44 and 45 is important for smooth rotation of the side stand 40. Since the base end portion of the side stand 40 is formed as the U-shaped attaching portion 42 which is an integral component or single piece having the pair of opposed walls 44 and 45, the dimensional accuracy of the pair of opposed walls 44 and 45 improves. Accordingly, a large error in the dimension of the gap 46, which tends to occur when the pair of opposed walls 44 and 45 are formed as separate components, does not occur. As a result, rattling caused when the side stand 40 is rotated is suppressed, and the side stand 40 can be smoothly rotated.

Although the present invention has been described above in connection with the preferred embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

39 . . . support bracket of motorcycle frame structure
40 . . . side stand
41 . . . leg portion
42 . . . attaching portion
43 . . . ground contact portion
44 . . . one opposed wall
44a . . . insertion hole
44b . . . outer surface of one opposed wall
45 . . . other opposed wall
45a . . . threaded hole
45b . . . inner surface of other opposed wall
46 . . . gap
47 . . . collar
47a . . . flange portion
48 . . . screw member
48a . . . head portion
49 . . . nut
53 . . . spring
L1 . . . extension allowance
G . . . ground

What is claimed is:

1. A side stand for mounting on a support bracket connected to a motorcycle comprising:

a pair of opposed walls with an opening between the opposed walls for receiving a part of the support bracket, wherein each wall has an insertion hole that is aligned opposite an insertion hole on the other wall, one of the insertion holes is larger than the other insertion hole;

a hollow tubular collar with a flange portion larger than the larger insertion hole is mounted to extend through the larger insertion hole for rotatably supporting movement of a leg portion that extends from the pair of opposed walls to support the motorcycle when rotated to contact a support surface and to be rotatably returned to store the leg portion during movement of the motorcycle, the flange portion extends on an exterior of the wall side of the larger insertion hole, the other end of the hollow tubular collar contacts an inner side of the wall adjust the smaller insertion hole that has threads; and a screw member with complementary threads to the threads of the smaller insertion hole has a larger head portion that is complementary to the collar flange portion whereby the screw member can be attached to and extend beyond the complementary threads of the wall to receive a nut for locking the screw member within the hollow tubular collar to enable rotation of the side stand around the hollow tubular collar while providing an axial force distribution through a screw member length longer than a distance between the outer sides of each opposed wall.

2. The side stand as claimed in claim 1, wherein a U-shaped attaching portion includes the pair of opposed walls that are connected to the side stand to enable a rotatably supporting movement of the leg portion.

3. The side stand as claimed in claim 2, wherein the U-shaped attaching portion is a single piece with the pair of opposed walls.

4. The side stand as claimed in claim 3 wherein the side stand is supported by a motorcycle frame structure via the support bracket that is inserted into a gap between the pair of opposed walls and the side stand is rotatably attached to the support bracket via the screw member and the nut.

5. The side stand as claimed in claim 4 wherein the hollow tubular collar extends in an insertion hole of the one opposed wall and a through hole of the support bracket.

6. The side stand as claimed in claim 5 wherein the screw member has a male thread formed in a portion to be inserted into the through hole of the support bracket.

\* \* \* \* \*